United States Patent
Palmer et al.

(10) Patent No.: US 9,091,775 B1
(45) Date of Patent: Jul. 28, 2015

(54) METHOD AND APPARATUS FOR DETECTING AND LOCATING CAMERA ILLUMINATORS

(71) Applicant: Sierra Innotek, Inc., Cameron Park, CA (US)

(72) Inventors: William R. Palmer, Rescue, CA (US); Stephen L. Palmer, Cameron Park, CA (US); Thomas Wilton White, III, Placerville, CA (US)

(73) Assignee: Sierra Innotek, Inc., Cameron Park, CA (US)

( * ) Notice: Subject to any disclaimer, the term of this patent is extended or adjusted under 35 U.S.C. 154(b) by 0 days.

(21) Appl. No.: 14/172,540

(22) Filed: Feb. 4, 2014

Related U.S. Application Data

(60) Provisional application No. 61/760,559, filed on Feb. 4, 2013.

(51) Int. Cl.
  *G01J 5/02* (2006.01)
  *G01V 8/10* (2006.01)
(52) U.S. Cl.
  CPC .......................................... *G01V 8/10* (2013.01)
(58) Field of Classification Search
  CPC ....................................................... G06T 7/0008
  USPC .................................... 250/340, 341.1–341.8
  See application file for complete search history.

(56) References Cited

U.S. PATENT DOCUMENTS

| | | | |
|---|---|---|---|
| 6,904,347 B1* | 6/2005 | Berenz et al. .................... | 701/45 |
| 8,184,175 B2* | 5/2012 | Mooradian et al. ......... | 348/222.1 |
| 2006/0159440 A1* | 7/2006 | Purkayastha et al. ........... | 396/89 |
| 2007/0103552 A1* | 5/2007 | Patel et al. ..................... | 348/203 |
| 2010/0053359 A1* | 3/2010 | Mooradian et al. ......... | 348/222.1 |
| 2012/0229637 A1* | 9/2012 | Mooradian et al. ........... | 348/143 |

* cited by examiner

*Primary Examiner* — Kiho Kim
(74) *Attorney, Agent, or Firm* — McHale & Slavin, P.A.

(57) ABSTRACT

A method and apparatus is described whereby invisible camera illuminators may be readily identified and located. In one embodiment the method of detecting the presence of an imaging system producing an invisible illuminator includes introducing a first optical filter capable of blocking energy from an LED infrared illuminator band source and allow energy from broadband visible light source to pass with minimal attenuation; and introducing a second optical filter that permits most of the energy from said infrared illuminator to pass and blocks a substantial portion of said broadband visible light; wherein said filtered LED infrared illuminator and said broadband visible light blink on and off.

25 Claims, 8 Drawing Sheets

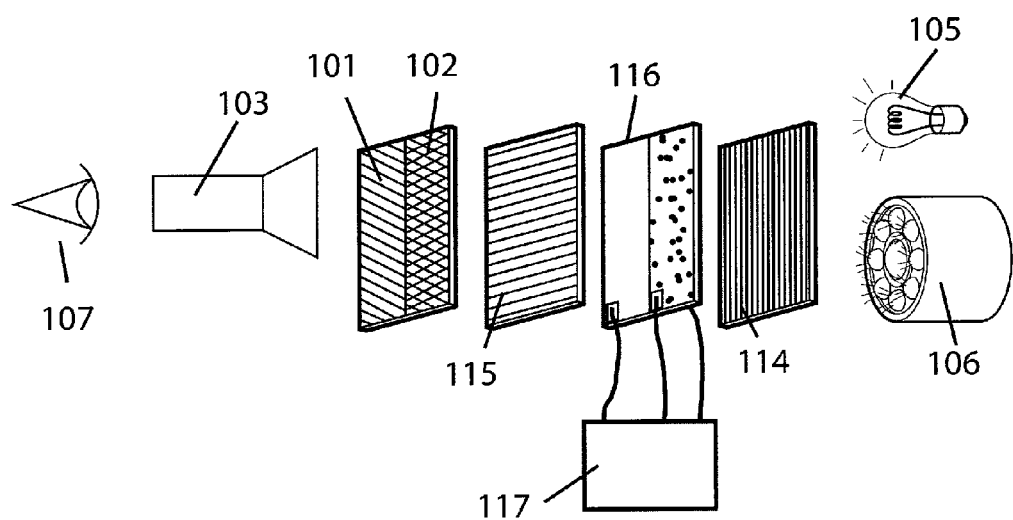
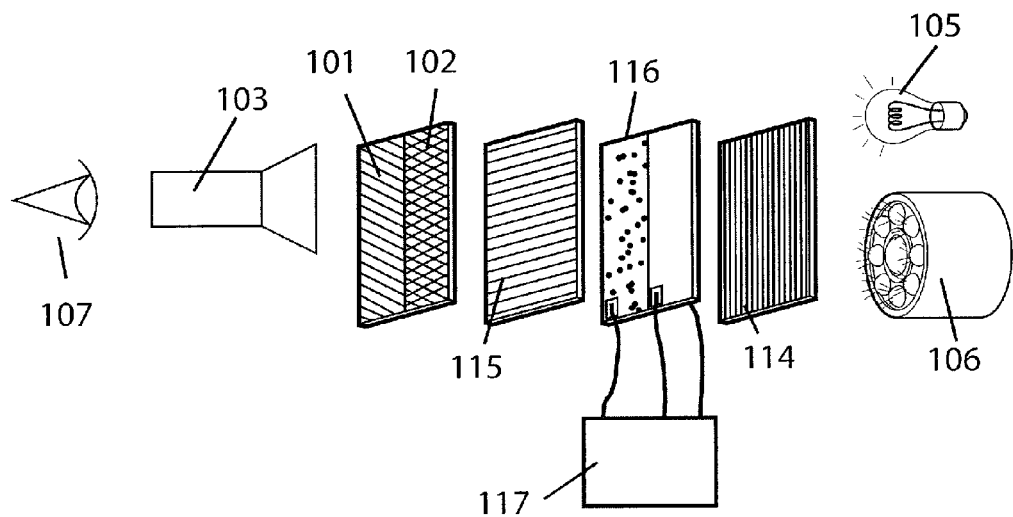

METHOD AND APPARATUS FOR DETECTING AND LOCATING CAMERA ILLUMINATORS

PRIORITY CLAIM

In accordance with 37 C.F.R. §1.76, a claim of priority is included in an Application Data Sheet filed concurrently herewith. Accordingly, the present invention claims priority to U.S. Provisional Patent Application No. 61/760,559, filed Feb. 4, 2013, and entitled "MEANS AND METHOD FOR DETECTING AND LOCATING CAMERA ILLUMINATORS" the contents of which is incorporated herein by reference.

FIELD OF THE INVENTION

This invention is directed toward the field of detection and location of camera illuminators and by inference, cameras thereby associated.

BACKGROUND OF THE INVENTION

There is a need in military and law enforcement to be able to detect and determine the location of camera illuminators. Recent developments in electronic imaging cameras permit their function even in very low levels of light. Additionally, the cost of these cameras has dramatically decreased in recent years. The increased sensitivity and reduced cost of these cameras now permit their use in venues that were previously impractical. One use for these cameras is to provide security for criminal operations. A criminal enterprise can now employ a number of "security cameras" in and around their establishment to monitor activity that might be detrimental to their business. The use of these cameras makes it difficult for law enforcement to safely approach these establishments in a covert manner. If a means could be devised to detect the presence of and identify the location of these cameras it would be of significant value to law enforcement. Further, if the means were "passive" it would allow law enforcement personnel to perform this detection process in a covert manner.

SUMMARY OF THE INVENTION

It is an object of this invention to provide a system adapted to be used with night vision systems and other imagers or cameras capable of imaging infrared energy. It is a further object of this invention to provide a system to indicate the presence and location of security cameras by imaging the invisible illuminators that are usually associated with these cameras. Typically, these imagers or cameras will utilize an illumination system comprising invisible infrared radiation sources. The wavelength of the illuminator is generally in the near infrared, just outside the range of normal human vision. While these wavelengths are not readily visible to the unaided human eye, they may be seen by the use of special imagers such as CMOS cameras or night vision systems. Law enforcement will frequently use night vision equipment that permits one to "see in the dark." This night vision equipment functions by amplifying the available light and producing an image from this light. Starlight, moonlight and even "skyglow" contribute to the light that is amplified to produce a visible image of the area being viewed. In order to maximize the use of available "light", a portion of the infrared spectrum is also amplified and imaged. While not as sensitive as night vision equipment, CMOS and other solid-state cameras can also image energy in the infrared as well as the visible portion of the spectrum. Unfortunately, night vision systems and most electronic cameras do not distinguish between visible light and infrared energy. That is, the image a viewer sees is made up of both visible and invisible energy. Additionally, there may be a plurality of light sources that are not of interest such as streetlights, porch lights or other wideband or multiband light sources. Examples of multi-band light sources include visible "white" LED illuminators, fluorescent lamps and metal vapor lamps. These light sources, which are typically man-made, visible light sources, create background "clutter" or "noise" that without the instant invention is indiscernible from the invisible illuminators used with the aforementioned security cameras. Since these man-made light sources are designed to aid human vision, they are generally of a broad, or at least a distributed multi-band, visible-spectrum design so that at least some color recognition may be realized. In any case, these light sources are not designed to produce infrared emissions and if they do, it is as a component of a broader spectrum of energy, said energy typically comprising both infrared energy and visible light. The camera illuminators previously mentioned typically employ a plurality of infrared LEDs as a source of illumination. The nature of these LEDs is to emit infrared energy of a specified but relatively narrow bandwidth. Since this energy occupies a relatively narrow band and is outside the wavelengths of visible light it may be preferentially detected. The use of optical filters that block some wavelengths and permit other wavelengths to pass can be useful in discerning the LED-based infrared illuminators from other light sources. The energy produced by these LED illuminators is relatively small when compared to, for example, an incandescent or fluorescent porch lamp. Because the energy emitted by a typical incandescent or fluorescent lamp may be many orders of magnitude greater than that of an LED illuminator, these broadband light sources can make it difficult to discern the lower powered LED sources. The instant invention provides a means of making the relatively narrow band infrared LED produced energy stand out from that of conventional light sources. An additional feature of the invention is that it minimizes visual clutter in the image from those sources that do not emit significant energy in the wavelengths of interest, for example white LEDs, which often emit very little energy at wavelengths longer than 700 nm are therefore invisible to this system. The introduction of a temporally and/or spatially sequenced band pass or band block filter or filters prior to the imaging system (night vision or electronic camera) is employed to produce a video image in which the LED based illuminators appear to flash on and off, while the broadband emitters such as incandescent lamps do not flash. Multi-band emitters may flash slightly, but to a much lesser degree than that of the narrow-band illuminators. The benefits of this system are not limited to only those illuminators that are in line-of-sight of the imager. A significant advantage of this system is that it can also discern indirect infrared energy. For example, energy from an illuminator that may be illuminating a tree, wall or other objects will also be seen to blink, thereby alerting the user to an infrared source and by association, a camera. This is particularly useful in that a user can detect the presence of a security camera before coming into view of that camera.

BRIEF DESCRIPTION OF THE FIGURES

FIG. 6*a* is a schematic view of a detector employing two filters and an electronic shutter in a first state.

FIG. 6*a* is a schematic view of a detector employing two filters and an electronic shutter in a second state.

DETAILED DESCRIPTION OF THE INVENTION

Figure 1A:
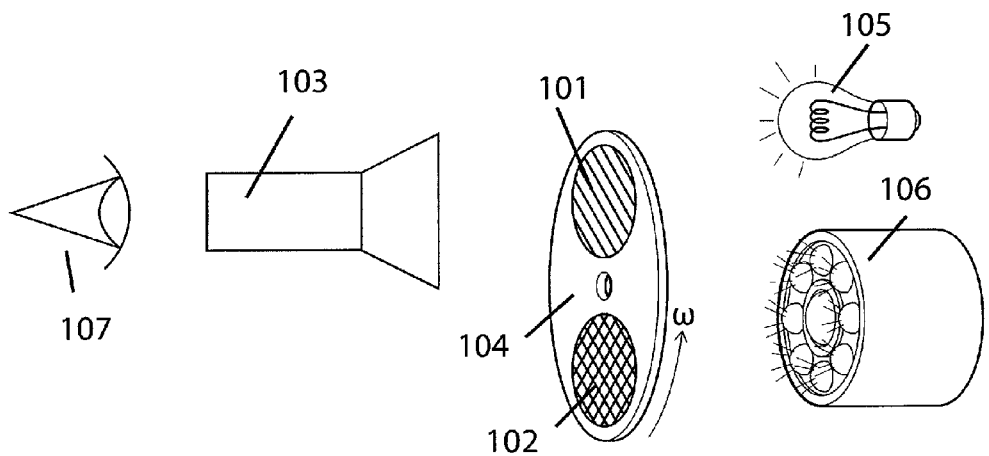
FIG. 1a is a schematic view of a detector employing two filters on a rotating filter wheel.

In a first mode of operation (see table 1) the system introduces a first optical filter that preferentially blocks the energy from the infrared illuminators but permits energy from broadband or multi-band sources to pass with minimal attenuation.

TABLE 1

| MODE | Filter A (if used) | Filter B (if used) |
| --- | --- | --- |
| 1 | Attenuates IR | Attenuates visible |
| 2 | Attenuates IR | Attenuates IR and visible including filters with optical densities of 0 (zero) |
| 3 | Attenuates first IR wavelength | Attenuates second IR wavelength |

The system then introduces a second optical filter that permits most of the energy from the infrared illuminator to pass but which blocks a substantial portion of the broadband or multi-band visible light. In the mode of operation just described, both the narrow band LED illuminators and the wide band light sources will appear to blink on and off. The narrow band sources will, however, blink out of phase with the broadband sources. An observer may then differentiate the camera illuminators (narrow band source) from the "normal" (wide band or multi-band) light sources by observing which energy sources appear light/dark with respect to one another at any given time. Such a system, while functional, is awkward to use in that every energy source in the image will at one time or another appear to flash. Additionally, this flashing is quite distracting if the user desires to observe the image for the presence of persons, vehicles or other objects.

A second mode of operation (see Table 1) also utilizes two optical filters that are alternately placed in front of the imagining system. In this second system, the first optical filter (A) placed in front of the imager is of a type that will preferentially block the wavelengths of the camera illuminator with respect to visible light sources. A second filter (B) is then placed in front of the imager. This second filter provides attenuation of both visible light energy and infrared energy. Such a filter is sometimes referred to as a "neutral density" filter in that its attenuation characteristics are relatively constant over a specified range of wavelengths. Since filter A blocks only a relatively narrow spectrum of energy in the infrared, most of the energy from the scene to be imaged still passes to the imager. In this arrangement there is almost no blinking of wideband energy sources (moonlight, porch lights, etc.) and the scene is readily observed with minimal distraction. The narrow band illuminator sources however are highly apparent in that they appear to blink on and off in the imager. A viewer of the imager then need only look for the blinking sources to determine not only their presence but also their location with respect to other objects in the image.

Not all infrared illuminators employ LEDs that emit energy at the same wavelengths. While it is uncommon for a single illuminator to utilize LEDs of different wavelengths, various illuminators may employ LEDs of various wavelengths. Typical wavelengths of infrared LED illuminators are 850 nm and 940 nm. To increase the likelihood that all infrared illuminators will be identified, regardless of wavelength, a third mode of operation may be employed (see Table 1). This third mode of operation also employs the use of two filters that are alternately placed in front of the imager. The A filter is of the narrow band-pass type. In this mode however, the B filter is also a narrow band-pass type filter. Filter A preferentially permits a first infrared energy wavelength to pass while filter B preferentially permits a second wavelength of infrared energy to pass. Preferably the pass-band of filter A is chosen so as to be centered on the first LED wavelength and filter B is chosen to be centered on a second LED wavelength. These filters are also chosen such that the degree of attenuation of "normal" light sources by filter A and by filter B is approximately equal. Choosing filters of relatively equal "normal" light attenuation provides an image for the viewer that is relatively flicker-free, save the narrow band illuminators that, by their apparent blinking, clearly stand out from the background.

Figure 1B:
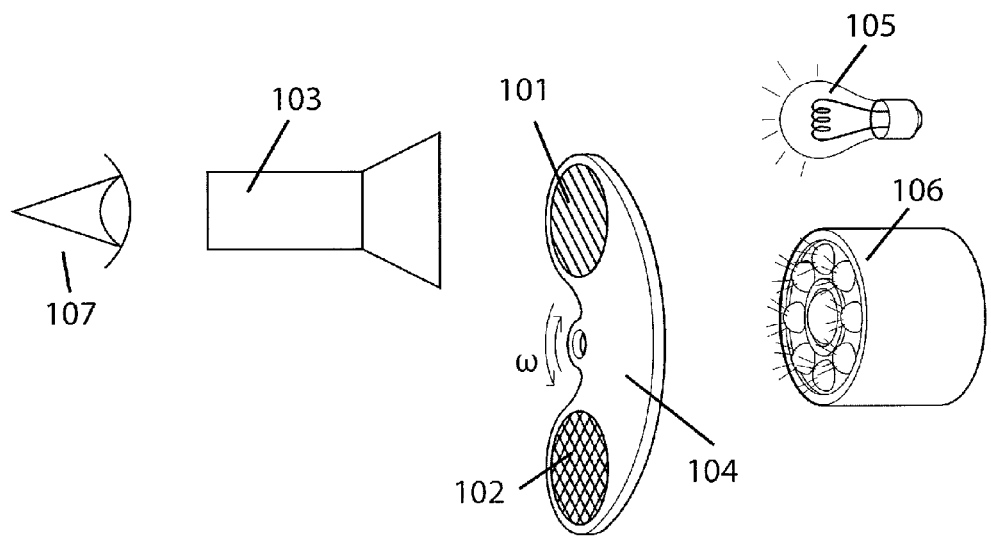
FIG. 1*b* is a schematic view of a detector employing two filters on an oscillating filter wheel.
Figure 2:
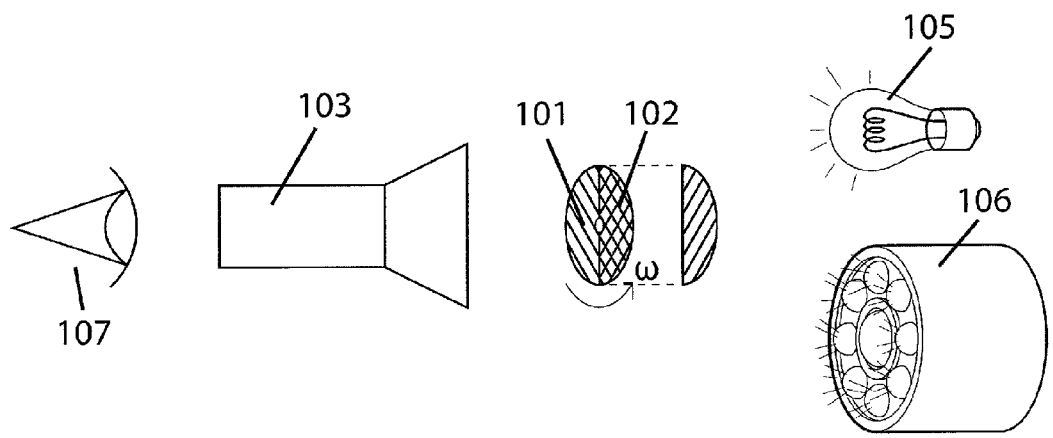
FIG. 2 is a schematic of a detector employing filters in a "Double D" configuration.

One method of alternately placing a first filter and then a second filter in front of an imager employs a rotating filter wheel and is illustrated in FIG. 1. The two (or more) filters may be situated on a rotating wheel such that when the wheel is rotated the first filter 101 and then the second filter 102 are alternately positioned in front of the imager 103. The filters may be conveniently mounted on a filter wheel 104, which wheel may be rotated either manually or by a motor. Optical energy from broadband (conventional) light sources 105 and optical energy from infrared illuminator 106 pass through the filters and enter the imager. The imager converts both visible and invisible energy, infrared energy for example, into a visible image that can be seen by the human observer 107. FIG. 1*b* depicts a similar form of the device except that the movable filter assembly moves in a reciprocating motion as opposed to a continuous rotating motion. A preferred form of either the continuous motion or reciprocating motion system uses a first filter 101 and a second filter 102 (see FIG. 2) that each comprise a semi-circular shape. The two filters are arranged "back to back" to form a circular element. This element may then be placed in a circular frame or other mount so that the filters may be rotated together. When placed in front of an imager, these filters provide spatially controllable filtering of the energy rays entering the imager. When the filters are rotated the spatial filtering also rotates thereby causing narrow-band energy sources to appear to blink in the imager with each rotation of the filter assembly. If the area of each individual filter is not of sufficient size to completely intercept all of the energy rays entering the imager and if the filter elements are not in the focal plane of the imager a "fogging" effect may be observed. This is because the filters are "out of focus" to the imager and only part of the rays entering the imager have been altered by the filters. The resulting image is a combination of the in-focus rays passing through the filters, the in-focus rays passing around the filters, and, any edges of the filters that appear out of focus to the imager. This results in an image in which the transition from one filter to the second is blurred. This diminishes the blink effect of the narrow band energy sources to an extent that they are less discernable. Since most imagers employ lenses of a circular nature, it is convenient to employ the "double D" design previously discussed. To avoid the problem of blurring or fogging, a spatial filter may be employed. This spatial filter is preferably "D" shaped and the band-pass filters rotate relative to it. The spatial filter blocks each filter part of the time. The relative motion of the spatial filter and narrow-band filters allows energy to pass through either one narrow-band filter or the other or a combination of these filters. This results in a blinking effect for narrow-band light sources that are within the pass-band of one or the other filters.

Figure 3:
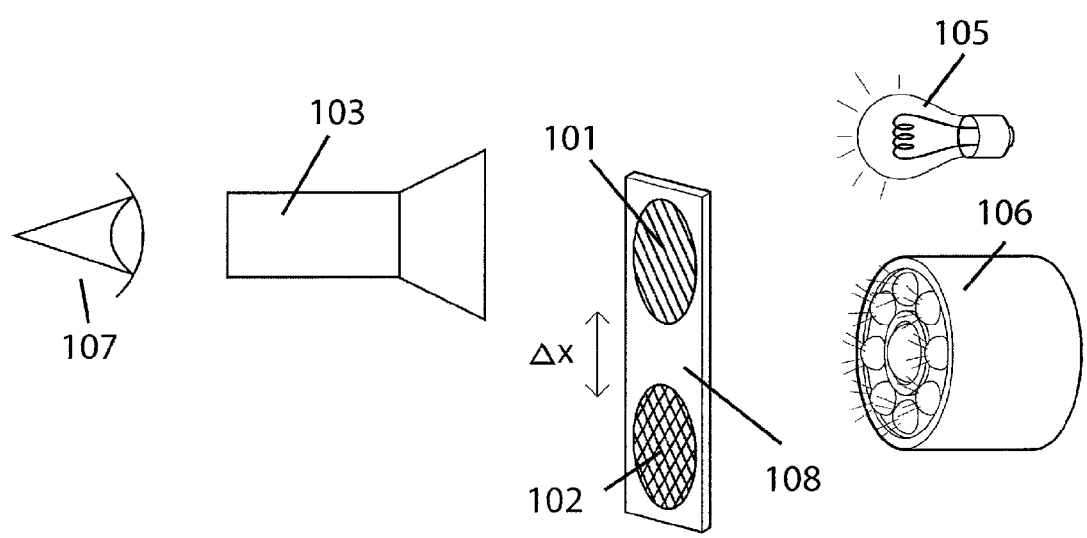
FIG. 3 is a schematic of a detector employing two filters in a shuttle configuration.

A second method of alternately placing two filters in front of an imager is illustrated in FIG. 3 and may be realized by placing the filters on a shuttle 108. This shuttle moves back and forth relative to the imager so that first filter 101 and then the second filter 102 are alternately placed in front of the imager. Movement of the shuttle may be accomplished with either a motor or manually.

Figure 4A:
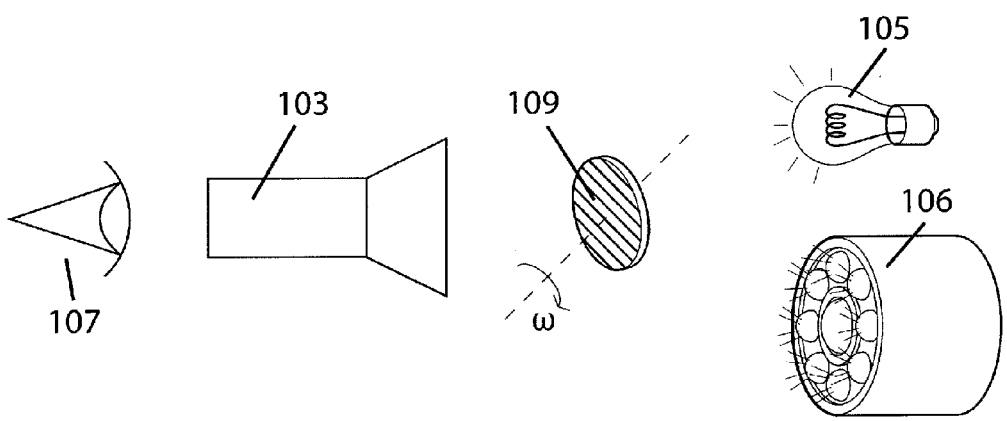
FIG. 4*a* is a schematic of a detector employing a single filter at a first variable angle position.
Figure 4B:
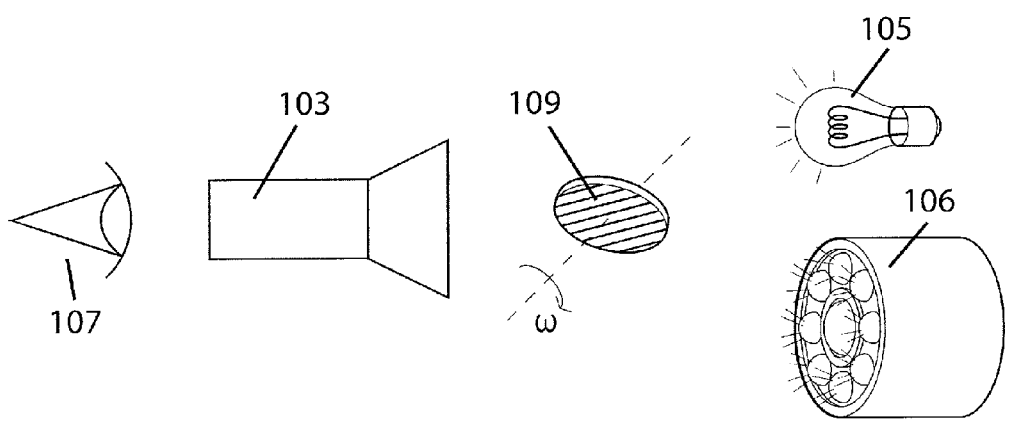
FIG. 4*b* is a schematic of a detector employing a single filter at a second variable angle position.
Figure 5:
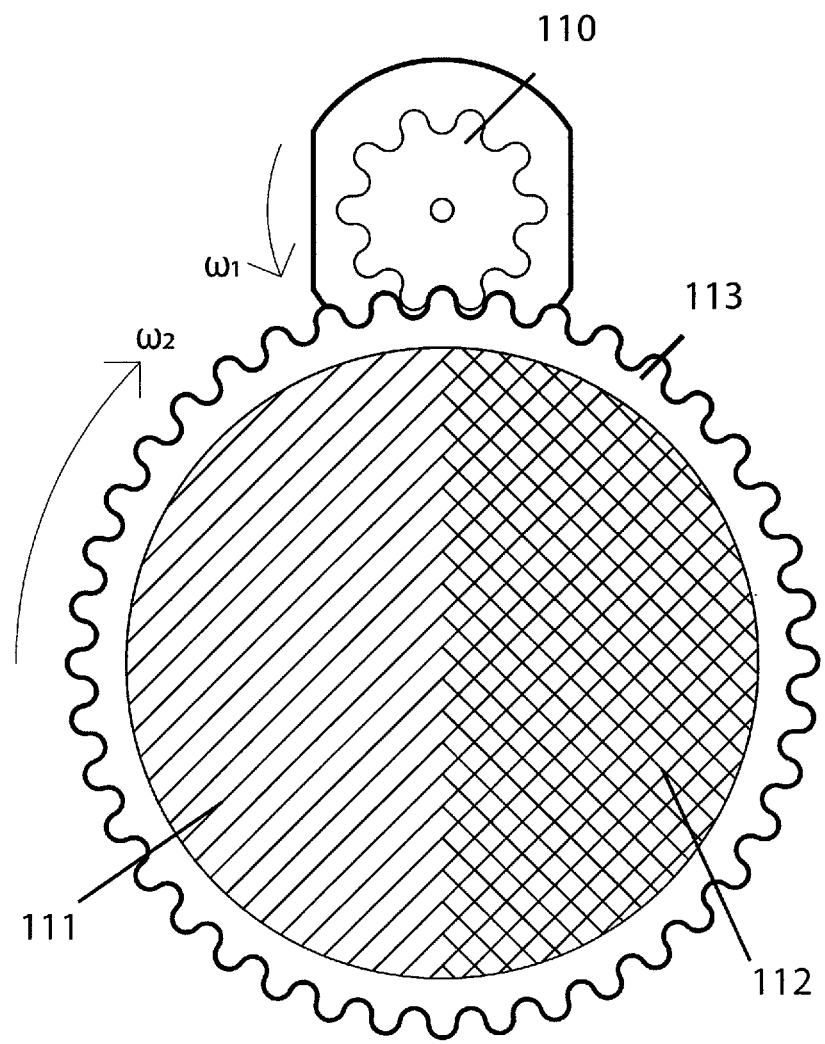
FIG. 5 shows a "Double D" filter arrangement with motor drive.

A novel method of achieving the results of the two-filter process is illustrated in FIGS. 4a and 4b and employs a dielectric filter 109, also known as a thin-film filter. This type of filter selectively filters light by optical interference. A dielectric filter that is designed to block light at a specified wavelength can be made to block light at other wavelengths if the filter is adjusted so that the light does not pass through the filter normal to its plane. For example, a filter designed to block light at 600 nm can be adjusted to block light at 500 nm by tilting that filter from its normal axis relative to the light rays. Using this property, a single filter system can be devised in which the filter is tilted to provide optical attenuation over a specified range of wavelengths. If this range of wavelengths can be swept both into and out of the narrow band of an illuminator, the illuminator will appear to flash as the effective filter wavelength is swept through the wavelengths of the illuminator. As long as the filter range does not enter into the visible range or at least as long as the attenuation band of the filter is relatively narrow, the background of the image, that is "normal" lights, will not appear to blink. This sweeping may be accomplished either manually or by a motor. A convenient means of effecting the dielectric filter tilt is to mount the filter off-axis in a rotatable carriage. For simplicity, the carriage is not shown and the axis of filter rotation is represented by a dashed line in FIGS. 4a and 4b. The filter is also mounted off-axis to the shaft about which it rotates. The axis of rotation is also, off-angle to the imager. As the carriage is rotated, the relative angle of the filter with respect to the imager will change. FIG. 4a depicts the filter in a first position, in which the filter face is normal or nearly normal to rays of light entering the imager 103 so that it blocks a first wavelength of energy to the imager. FIG. 4b depicts the filter having been rotated to a second position in which the filter face is not normal to the rays of light entering the imager so that it blocks a second wavelength of energy to the imager. This change in angle of the filter relative to the imager will produce the desired wavelength sweeping described above. Similar results may be obtained if the dielectric filters are of a band-pass type as opposed to a band-block type. In this case, the flashing of the broadband source relative to the infrared source will be reversed as compared to the band-block filter version. Since the diameter of the filter appears foreshortened to the imager when the filter is off axis relative to the imager, a filter of a larger diameter than that of the imager is preferable to avoid the fogging or blurring issues previously described. Any of the systems described above can employ anti-reflection (AR) coatings to avoid glints of light being reflected to the surveillance cameras by the invention.

A convenient means of driving the previously described filter schemes is to employ a small motor. In one form of the device a motor equipped with a pinon gear, 110 is used to drive a ring gear 113. In this illustration, the ring gear assembly comprises the "double D" filter system described above and employing a first filter 101 and a second filter 102. The entire device may be self-powered and designed to attach to a night vision system by simply friction fitting onto the objective lens of the night vision system. The system may simply be switched off and viewed through should it be desired to observe the image without the on-off blink effect. The device is compact and permits the user to readily remove the device should it be desired to use the night vision system by itself.

A variation on the motor driven application of two filters as described above is to employ optical shutters. Is this embodiment, the two optical filters are stationary but an optical shutter is used to alternately permit light to pass through the first filter but not the second, and then through the second filter but not the first. This may be accomplished by the use of one or more mechanical shutters that may be motor or solenoid driven or operated by any other known means. The shutters may also be of an electro-optical nature such as liquid crystal shutters as is illustrated in FIGS. 6a and 6b. In this arrangement, light from broadband sources 105 and infrared illuminators 106 passes through a first polarizing filter 114, then through a liquid crystal element 116, next through a second polarizing filter 115 then through a band filter (either 101 or 102) and finally into the imager 103. The first polarizer blocks light that is not of a vibrational orientation to pass through the filter. The liquid crystal element then rotates the light so that it may be selectively allowed either to pass or not pass through the second polarizing filter 115. The liquid crystal shutter comprises a plurality of zones (two illustrated) which zones may be controlled independently by an electronic controller 117. Each zone may be controlled to permit light to pass or not to pass through it. This is illustrated by reviewing the state of the liquid crystal element 116 (the darkened side) in FIG. 6a and comparing it to the darkened side in FIG. 6b. A first filter 101 is placed in the light path through one zone and a second filter 102 is placed in the light path through the second zone. The LCD element may then be switchably controlled to permit either infrared energy or visible light to pass through it and into the imager. This arrangement can be configured so that the infrared sources, appear to flash in the image, thereby causing them to stand out with respect to other broadband or multi-spectral sources that may not be of interest. One of the filters 101 or 102 may be of a neutral density type with an optical density as low as 0.

Figure 7:
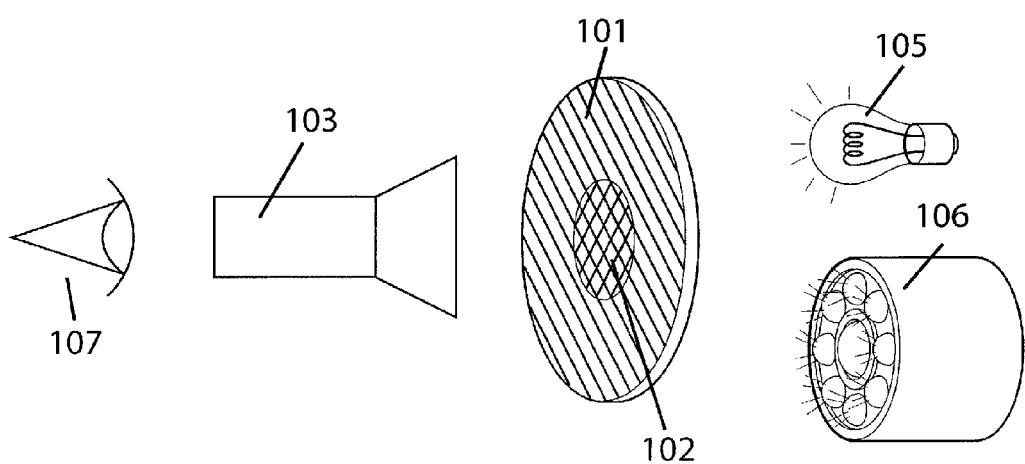
FIG. 7 is a schematic of a detector employing two filters.
Figure 8:
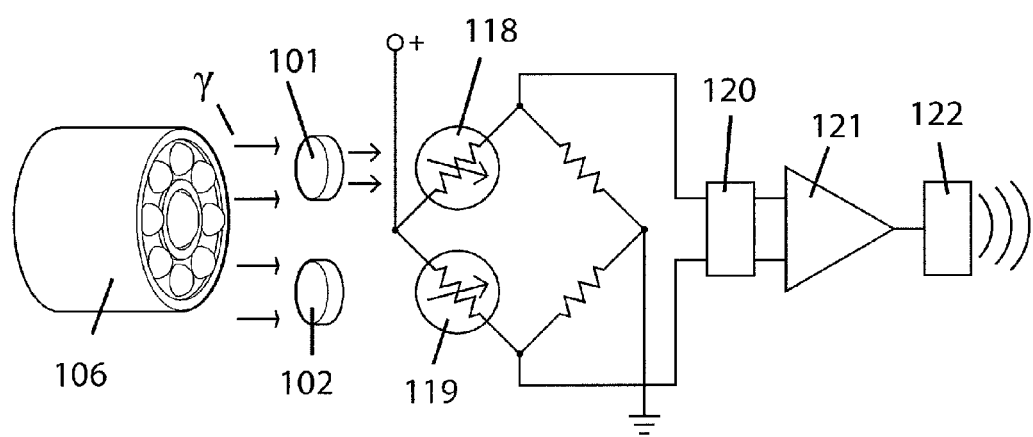
FIG. 8 is a schematic of a detector employing two filters that are optically coupled to an electronic comparitor.

A functional means of employing the two filters without using optical shutters or motors is illustrated in FIG. 7 and utilizes the double "D" or any other multiple filter format. In this case the filters are positioned in front of the imager and remain stationary with respect to the imager. To utilize the device, the user simply rocks or tilts the imager and the attached filters back and forth so that the rays emanating from the suspected infrared source alternately pass through the first filter and into the imager and then through the second filter and into the imager. The narrow-band infrared sources then appear to blink as the rays alternately pass through each of the two filters. This filter system functions best if the filters are near to the focal plane of the imager, but this is not a requirement. It is not necessary that the filters be of the double "D" design. For example, a first filter 102 in the form of a disk can be situated inside a second filter 101 in the form of a ring so that the blink effect may be realized when the object being viewed is alternately viewed through first the disk and then the ring shaped filter. As previously discussed, one of the filters may be of the neutral-density type including filters with an optical density of 0.

Another embodiment of the device employs a plurality of optical detectors that are not necessarily image detectors. In this embodiment, a first optical detector 118, for example a silicon detector, is outfitted with a first optical filter 101 that may be a band-pass filter. Said filter being designed to selectively pass one of the wavelengths of interest, for example 850 nm. With this arrangement, the signal output of the detector is significantly higher when exposed to energy levels at the wavelength of interest as compared to similar energy levels at other wavelengths. At least a second detector 119 is also fitted with a band-pass filter 102, said filter being designed to selectively pass a second wavelength, for example 940 nm. This second wavelength may either be a second wavelength of interest or a wavelength that is close to the first wavelength of interest in which case, the filter provide a baseline for comparison. A neutral density filter may also be employed in place of the second band-pass filter with similar effect. The output signal of the detectors is adjusted as required by a signal conditioner 120 and compared and amplified by comparitor-amplifier 121. The difference in these signals is sent to an annunciator 122 such as an audio speaker, a meter or a lamp. A narrow-band source 106 such as an infrared 940 nm LED camera illuminator will produce a relatively large signal in the detector equipped with the 940 nm band-pass filter. A relatively small signal will be produced in the detector equipped with the 850 nm band-pass filter. The difference between these signals is then relatively high. If the device is illuminated by a relatively broadband light source such as an incandescent lamp or it is illuminated by a multi-band emitter such as a metal vapor lamp which does not produce narrow lines of emission within the pass-band of the filters, the signal difference between the first detector and the second detector will be small. If this signal difference is connected to an appropriate output devise, the magnitude of the signal may be determined. High-level signals indicate the presence of a narrow-band source such as an infrared camera illuminator. Preferably, the device is configured such that the at least two detectors are capable of "seeing" in the same direction with approximately the same field of view. The device may then simply be pointed toward the region to be surveyed and swept back and forth across the region of interest (similar to using a telescope to scan for objects). Sources of narrow-band emissions are made immediately apparent and indicated by an increase in the difference signal from the detectors.

Any of the systems described above may employ a combination of band-pass filters, band-block filters, or neutral density filters in combination with similar results.

An additional filter may be employed with any of the embodiments described to minimize the effects of "nuisance" light sources. Such light sources include multi-band light sources such as sodium vapor lamps that may produce relatively narrow bands of energy at or near the energy wavelengths of interest.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention that are obvious to those skilled in the art are intended to be within the scope of the following claims.

What is claimed is:

1. A method of detecting the presence of an imaging system employing an invisible illuminator comprising the steps of:
   introducing a first optical filter capable of blocking energy from an LED infrared illuminator band source and allows energy from broadband visible light source to pass;
   introducing a second optical filter that permits energy from said infrared illuminator to pass and blocks a portion of said broadband visible light;
   wherein said filtered LED infrared illuminator and said broadband visible light blink on and off.

2. The method of detecting the presence of an imaging system employing an invisible illuminator according to claim 1 wherein said infrared LED illuminator wavelength is 850 nm or 940 nm.

3. The method of detecting the presence of an imaging system employing an invisible illuminator according to claim 1 wherein said LED infrared illuminator band source will blink out of phase with said broadband source.

4. The method of detecting the presence of an imaging system employing an invisible illuminator according to claim 1 wherein said imaging system is a night vision system or an electronic camera.

5. The method of detecting the presence of an imaging system employing an invisible illuminator according to claim 2 wherein said infrared energy is a band of LED produced energy that is distinguishable from conventional light.

6. The method of detecting the presence of an imaging system employing an invisible illuminator according to claim 1 wherein said second optical filter is neutral density.

7. A method of detecting the presence of an imaging system employing an invisible illuminator comprising the steps of:
   introducing a first optical filter to block the wavelengths of the imaging system with respect to visible light sources;
   introducing a second filter in front of the imaging system to provide attenuation of both visible light energy and infrared energy;
   whereby attenuation is relatively constant.

8. The method of detecting the presence of an imaging system employing an invisible illuminator according to claim 7 wherein said infrared LED illuminator wavelength is 850 nm or 940 nm.

9. The method of detecting the presence of an imaging system employing an invisible illuminator according to claim 8 wherein said infrared energy is a band of LED produced energy that is distinguishable from conventional light.

10. The method of detecting the presence of an imaging system employing an invisible illuminator according to claim 7 wherein said first filter or said second filter provide spatially controllable filtering of the energy rays entering the imager.

11. The method of detecting the presence of an imaging system employing an invisible illuminator according to claim 7 wherein the step of alternating a first and second filter in front of an image is performed by a rotating filter wheel.

12. The method of detecting the presence of an imaging system employing an invisible illuminator according to claim 7 wherein the step of alternating a first and second filter in front of an image is performed by a shuttle that moves back and forth relative to the imager so that first filter and then the second filter is placed in front of the imager.

13. The method of detecting the presence of an imaging system employing an invisible illuminator according to claim 7 wherein said filters are dielectric and adjusted so that light does not pass through the filter normal to its plane by tilting the filter from its normal axis relative to the light rays.

14. The method of detecting the presence of an imaging system employing an invisible illuminator according to claim 7 wherein said second optical filter is neutral density.

15. A method of detecting the presence of an imaging system employing an invisible illuminator comprising the steps of:
 introducing a first optical filter placed before the imaging system, said first optical filter of a narrow band-pass type allowing infrared energy wavelength to pass;
 introducing a second optical filter placed before the imaging system, said second optical filter of a narrow band-pass type allowing a second wavelength of infrared energy to pass;
 wherein the pass-band of the first optical filter is centered on the first LED wavelength and the second optical filter is centered on a second LED wavelength whereby the degree of attenuation approximately equal to provide an a relatively flicker-free image.

16. The method of detecting the presence of an imaging system employing an invisible illuminator according to claim 15 wherein said infrared LED illuminator wavelength is 850 nm or 940 nm.

17. The method of detecting the presence of an imaging system employing an invisible illuminator according to claim 15 wherein said infrared energy is a band of LED produced energy that is distinguishable from conventional light.

18. The method of detecting the presence of an imaging system employing an invisible illuminator according to claim 15 wherein said filters provide spatially controllable filtering of the energy rays entering the imager.

19. The method of detecting the presence of an imaging system employing an invisible illuminator according to claim 15 wherein the step of alternating a first and second filter in front of an image is performed by a rotating filter wheel.

20. The method of detecting the presence of an imaging system employing an invisible illuminator according to claim 19 wherein said rotating filter wheel is constructed and arranged to position said first and second filters back to back and rotated together.

21. The method of detecting the presence of an imaging system employing an invisible illuminator according to claim 15 wherein the step of alternating a first and second filter in front of an imager is performed by a shuttle that moves back and forth relative to the imager so that first filter and then the second filter is placed in front of the imager.

22. The method of detecting the presence of an imaging system employing an invisible illuminator according to claim 15 wherein said filters are dielectric and adjusted so that light does not pass through the filter normal to its plane by tilting the filter from its normal axis relative to the light rays.

23. The method of detecting the presence of an imaging system employing an invisible illuminator according to claim 15 wherein said first optical detector is a silicon detector outfitted with a first optical filter that is a band-pass filter to selectively pass wavelength of 850 nm; and said second optical detector is a silicon detector outfitted with a second optical filter that is a band-pass filter to selectively pass a wavelength of 940 nm.

24. The method of detecting the presence of an imaging system employing an invisible illuminator according to claim 23 wherein said first and second silicon detector are reversed.

25. The method of detecting the presence of an imaging system employing an invisible illuminator according to claim 15 wherein a neutral density filter is employed in place of the second band-pass filter.

* * * * *